United States Patent [19]
Goodwin

[11] Patent Number: 5,586,207
[45] Date of Patent: Dec. 17, 1996

[54] METHODS AND ASSEMBLIES FOR PACKAGING OPTO-ELECTRONIC DEVICES AND FOR COUPLING OPTICAL FIBERS TO THE PACKAGED DEVICES

[75] Inventor: John C. Goodwin, Nepean, Canada

[73] Assignee: Northern Telecom Limited, Montreal, Canada

[21] Appl. No.: 158,545

[22] Filed: Nov. 29, 1993

[51] Int. Cl.$^6$ .................................................. G02B 6/42
[52] U.S. Cl. ........................ 385/92; 385/94; 385/120
[58] Field of Search ................................. 385/120, 121, 385/122, 123, 124, 88–94

[56] References Cited

U.S. PATENT DOCUMENTS

| | | | |
|---|---|---|---|
| 3,423,594 | 1/1969 | Galopin | 385/93 X |
| 3,703,660 | 11/1972 | Fyler | 385/120 X |
| 3,797,910 | 3/1974 | Westwig | 385/120 |
| 3,907,403 | 9/1975 | Maeda | 385/120 |
| 3,950,075 | 4/1976 | Cook et al. | 385/93 |
| 4,222,629 | 9/1980 | Dassele et al. | 385/120 X |
| 4,707,067 | 11/1987 | Haberland et al. | 385/93 X |
| 4,741,595 | 5/1988 | Onoda et al. | 385/120 |
| 5,005,029 | 4/1991 | Fuse | 385/120 X |

*Primary Examiner*—John D. Lee
*Assistant Examiner*—Phan T. H. Palmer
*Attorney, Agent, or Firm*—C. W. Junkin

[57] ABSTRACT

In methods and assemblies for packaging opto-electronic devices and for coupling optical fibers to the packaged devices, a housing has a cavity for receiving an opto-electronic device and an opening into the cavity. A window is placed across the opening to seal the opto-electronic device in the cavity. The window comprises a plurality of substantially parallel optical fiber sections joined side-by-side. An alignment and retention arrangement is mechanically coupled to the housing and is operable to align an optical fiber to the opto-electronic device through the window and to retain the optical fiber in that alignment. The methods and assemblies are particularly applicable to cost reduced packaging of opto-electronic devices for communications applications.

14 Claims, 4 Drawing Sheets

METHODS AND ASSEMBLIES FOR
PACKAGING OPTO-ELECTRONIC DEVICES
AND FOR COUPLING OPTICAL FIBERS TO
THE PACKAGED DEVICES

FIELD OF INVENTION

This invention relates to methods for packaging opto-electronic devices and for coupling optical fibers to the packaged devices. This invention also relates to assemblies useful in performing those methods,

BACKGROUND OF INVENTION

Semiconductor lasers and photodetectors used in optical fiber communication systems are usually hermetically sealed in a package to ensure long term reliability. The package must permit optical coupling of the packaged opto-electronic devices to cabled optical fibers which carry optical signals between the packaged opto-electronic devices.

One known package for opto-electronic devices comprises a housing having a cavity for receiving an opto-electronic device. A single optical fiber passes through a small hole in the housing and has one end aligned with and adjacent to the opto-electronic device. The other end of the fiber segment is attached to a cabled optical fiber by a connector or splice to optically couple the opto-electronic device to the cabled fiber. The hole must be sealed around the optical fiber segment to ensure that the housing is hermetically sealed.

Unfortunately, it is difficult and time-consuming to align the optical fiber segment to the opto-electronic device and to secure the optical fiber segment in that alignment. Specialized alignment equipment and skilled operators are required to achieve the desired alignment, and this contributes significant capital and labour costs to the total cost of the packaged devices. The end of the optical fiber segment may require special treatment to form a taper or ball lens for improved coupling efficiency, and this adds further to equipment and labour costs. Moreover, to maintain accurate alignment, the fiber is generally secured at a point inside the housing in addition to being secured by the seal at the hole in the housing. Differential expansion of the fiber segment and the housing due to temperature shifts can cause breakage of the fiber segment.

Another known package for opto-electronic devices comprises a housing having a transparent window in the form of a glass or sapphire plate. The opto-electronic device inside the housing is optically coupled to an optical fiber outside the housing through the window. Using conventional assembly procedures and tolerances, the opto-electronic device is generally at least 400 microns from the end of the optical fiber outside of the housing.

The relatively large gap between the opto-electronic device and the fiber end causes an unacceptable coupling loss for many applications unless a focussing lens is disposed between the opto-electronic device and the optical fiber end. The focussing lens adds to the cost of the package. Moreover, the lens must be aligned with the opto-electronic device and the optical fiber, and must be secured in that alignment. This requires sophisticated lens mounting arrangements, specialized alignment equipment and skilled operators, adding further to the total package cost.

Some known packages for opto-electronic devices are designed to mate with standard optical fiber connectors to optically couple the opto-electronic device to an optical fiber. In the dominant connector types (e.g. the ST, SC and FC connector types), optical fibers to be connected are centered in spring-loaded ferrules. Many connectorized packages for opto-electronic devices have a recess for receiving and aligning a connector ferrule such that the optical fiber carried by the ferrule is optically coupled to the opto-electronic device, usually via a lens.

The end of the ferrule must be properly positioned with respect to the lens (usually at the focal point of the lens) for optimum coupling. To ensure proper positioning of the ferrule, the ferrule is urged by its spring against a stop formation of the receptacle, the stop formation being precisely positioned relative to the lens. Often the stop formation engages a chamfered edge of the ferrule. Unfortunately, while the diameter of these ferrules is standardized at 2.5 mm, the degree of chamfer is not standardized, and ferrules with different chamfers are urged into different positions in the receptacle, resulting in different coupling efficiencies.

SUMMARY OF INVENTION

An object of this invention is to avoid or reduce disadvantages of known packages for opto-electronic devices as outlined above.

One aspect of this invention provides a method for packaging an opto-electronic device and optically coupling a fiber thereto. The method comprises mounting the opto-electronic device in a cavity of a housing adjacent to a window extending across an opening of the housing, and aligning an optical fiber with the opto-electronic device through the window. The window comprises a plurality of substantially parallel optical fiber sections joined side-by-side, and the optical fiber has a leading face adjacent the window and a longitudinal axis substantially aligned with the optical fiber sections of the window.

Because the window comprises a plurality of substantially parallel optical fiber sections joined side-by-side, the divergence of an optical beam as it passes through the window is limited to the diameter of the optical fiber sections which is preferably less than 10 microns. Moreover, because there is limited optical divergence within the window and that divergence is independent of the window thickness, the window can be made as thick as desired. In particular, the window can be made thick enough to act as a stop for the leading end of the optical fiber or a carrier of the optical fiber. With limited optical divergence within the window, and little or no optical divergence between the window and the optical fiber, optical divergence between the opto-electronic device and the optical fiber is substantially limited to the optical divergence which occurs between the opto-electronic device and the window. By keeping the distance between the opto-electronic device and the window small (preferably less than 150 microns), the total optical divergence can be made small enough that no lens is required to provide adequate optical coupling for many applications, particularly where the fiber is a multimode optical fiber having a core diameter of 50 microns or greater. Moreover, because no lens is required and alignment of the optical fiber to the opto-electronic device can be achieved relatively simply after the opto-electronic device has been sealed in the housing, the method is relatively inexpensive.

Preferably the leading face of the optical fiber engages the window so that there is substantially no optical divergence between the window and the optical fiber.

In one embodiment, the housing comprises a header and a cap. The cap has an aperture therethrough, and the window is secured to, the cap to extend across and seal the aperture. The opto-electronic device is mounted in the cavity of the housing by mounting the opto-electronic device to a device mounting surface of the header, and securing the cap to the header over the opto-electronic device to define the cavity.

Another aspect of this invention provides an opto-electronic device assembly useful in performing the above method. The assembly comprises a housing, a window, and an alignment and retention arrangement. The housing has a cavity for receiving an opto-electronic device and an opening into the cavity. The window comprises a plurality of substantially parallel optical fiber sections joined side-by-side and is for placement across the opening to seal the opto-electronic device in the cavity. The alignment and retention arrangement is operable to align an optical fiber to the opto-electronic device through the window and to retain the optical fiber in that alignment.

Another aspect of the invention provides an opto-electronic device assembly which comprises a housing, an opto-electronic device, a window, and an alignment and retention arrangement. The housing has a cavity and an opening into the cavity. The opto-electronic device is mounted to the housing in the cavity and aligned with the opening. The window comprises a plurality of substantially parallel optical fiber sections joined side-by-side and extends across the opening to seal the opto-electronic device in the cavity. The alignment and retention arrangement is operable to align an optical fiber to the opto-electronic device through the window and to retain the fiber in that alignment.

BRIEF DESCRIPTION OF DRAWINGS

Embodiments of the invention are described below by way of example only. Reference is made to accompanying drawings in which.

DETAILED DESCRIPTION

Figure 1:
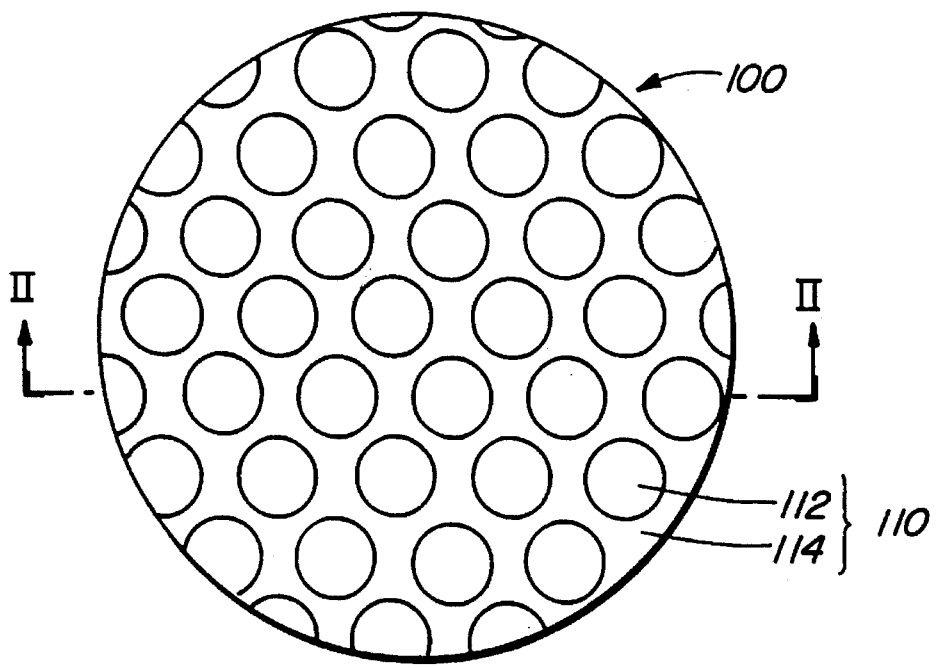
FIG. 1 is a plan view of a portion of a fused fiber window which forms part of assemblies according to embodiments of the invention.
Figure 2:
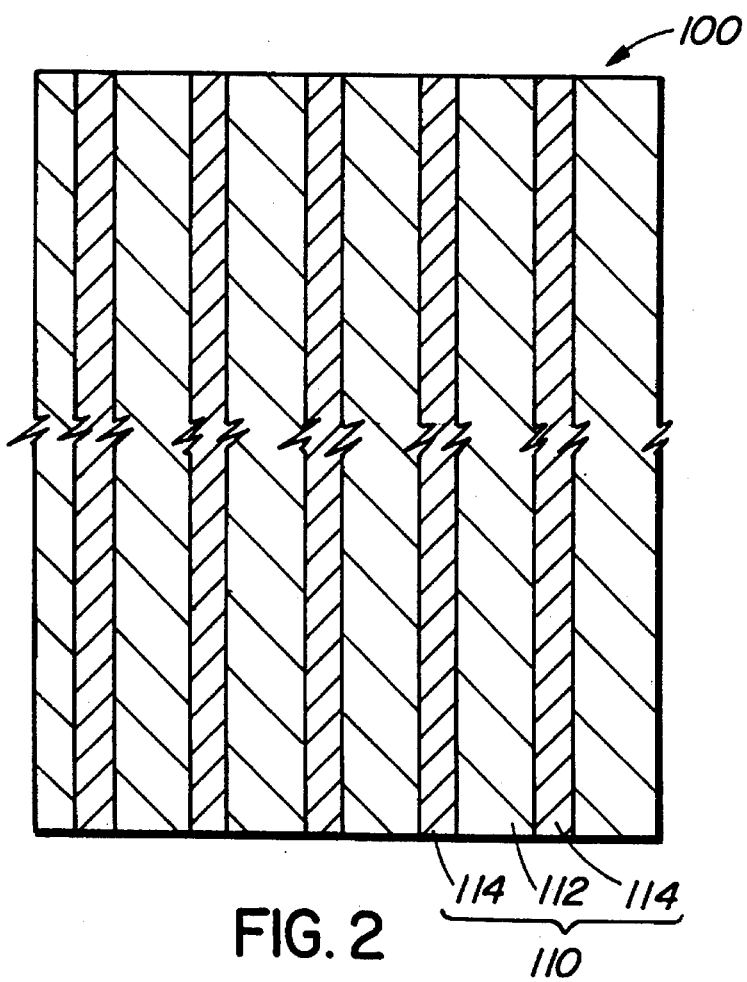
FIG. 2 is a cross-sectional view of the fused fiber window of FIG. 1 taken on section line II—II.

FIG. 1 is a plan view of a portion of a fused fiber window 100. FIG. 2 is a cross-sectional view of the fused fiber window 100 taken on section line II—II.

The fused fiber window 100 comprises a plurality of substantially parallel optical fiber sections 110 joined side-by-side. Each optical fiber section 110 comprises a cylindrical core 112 having a diameter less than 10 microns surrounded by a substantially non-absorbing cladding 114. Each optical fiber section 110 has a numerical aperture (NA) greater than 0.3. The optical fiber sections are secured in an arrangement having a packing fraction greater than 70% (i.e. the aggregate area of the cores 112 is greater than 70% of the total area of the window).

Such fused fiber windows are generally used to transfer an optical image from one surface to another. For example, fused fiber "faceplates" are used in cathode ray tubes for accurate image transfer from a phosphor layer inside the tube to an image plane outside the tube. Fused fiber windows are available from several manufacturers, including Collimated Holes, Inc., 460 Division Street, Campbell, Calif. 95008 and Galileo Electro-Optics Corporation, Sturbridge, Mass. 01566.

Figure 3:
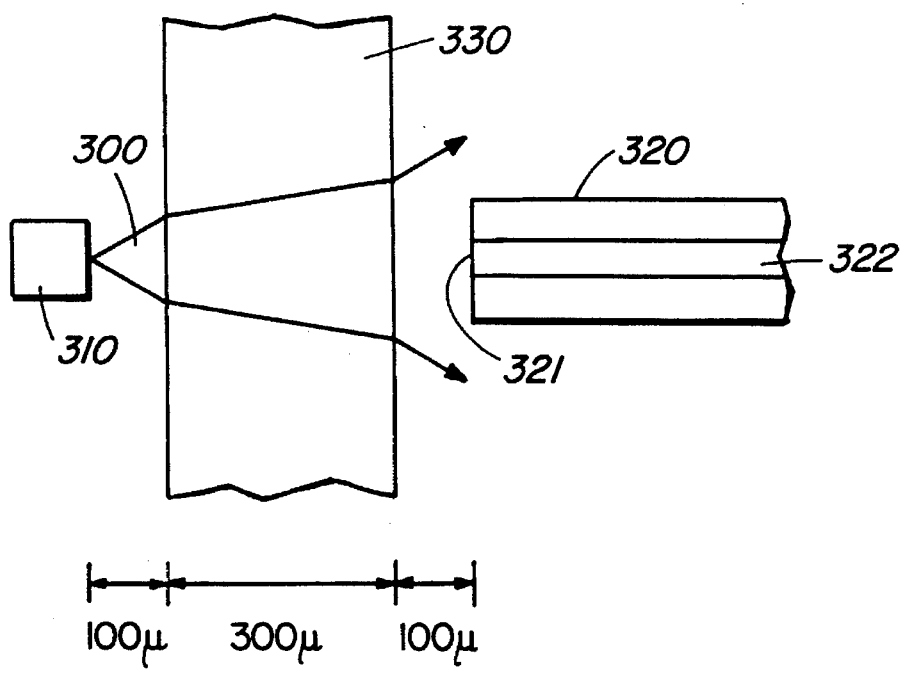
FIG. 3 is a schematic diagram showing optical beam divergence when a laser is coupled to an optical fiber through a conventional window.

FIG. 3 is a schematic diagram showing the divergence of an optical beam 300 when a semiconductor laser 310 is coupled to a multimode optical fiber 320 through a homogeneous glass or sapphire window 330 as used in some known packages for opto-electronic devices. Using conventional manufacturing processes and tolerances, the laser 310 must typically be about 100 microns from the window 330, the window 330 must typically be about 300 microns thick, and the fiber 320 must typically be at least 100 microns from the window 330 because the window. 330 is too thin and weak to act as a reliable stop for the fiber 320 which is usually surrounded by a rigid ferrule (not shown). Consequently, the optical beam 300 diverges over a total distance of approximately 500 microns, and a significant portion of the emitted light is not coupled into the core 322 of the fiber 320.

Figure 4:
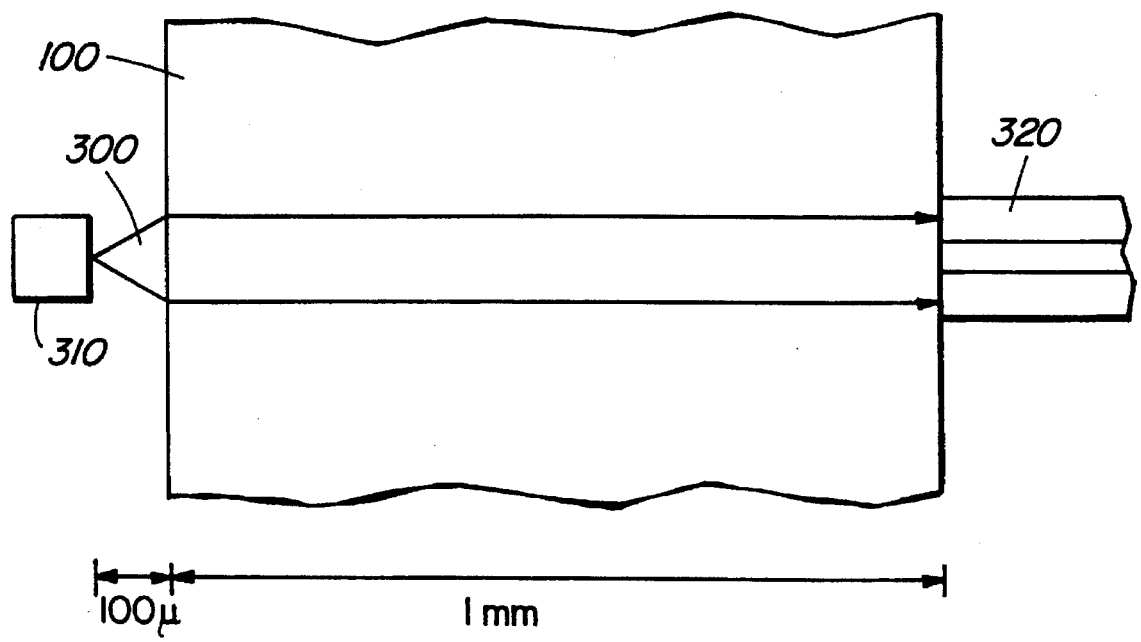
FIG. 4 is a schematic diagram showing optical beam divergence when a laser is coupled to an optical fiber through the fused fiber window of FIGS. 1 and 2.

FIG. 4 is a schematic diagram showing divergence of the optical beam 300 when the laser 310 is coupled to the optical fiber 320 through the fused fiber window 100 of FIGS. 1 and 2. As in the case illustrated in FIG. 3, the laser 310 must typically be about 100 microns from the window 100. However, light coupled into the fused fiber window 100 is conducted along the cores 112 of the optical fiber sections 110 (see FIG. 1), so the further divergence of the optical beam 300 within the window 100 is less than or equal to the diameter of the cores 112 (i.e. less than or equal to 10 microns). Consequently, the window 100 can be made as thick as desired without adding to the divergence of the optical beam 300. In particular, the window 100 can be made thick enough (approximately 1 mm) to serve as a reliable stop for the optical fiber 320 and any surrounding ferrule (not shown). With the optical fiber 320 firmly butted against the window 100, there is effectively no divergence of the optical beam 300 between the window 100 and the optical fiber 320. Consequently, use of the fused fiber window 100 in place of the homogeneous window reduces the divergence of the beam 300 between the laser 310 and the optical fiber 320 and significantly improves the optical coupling of the laser 310 to the optical fiber 320.

Figure 5:
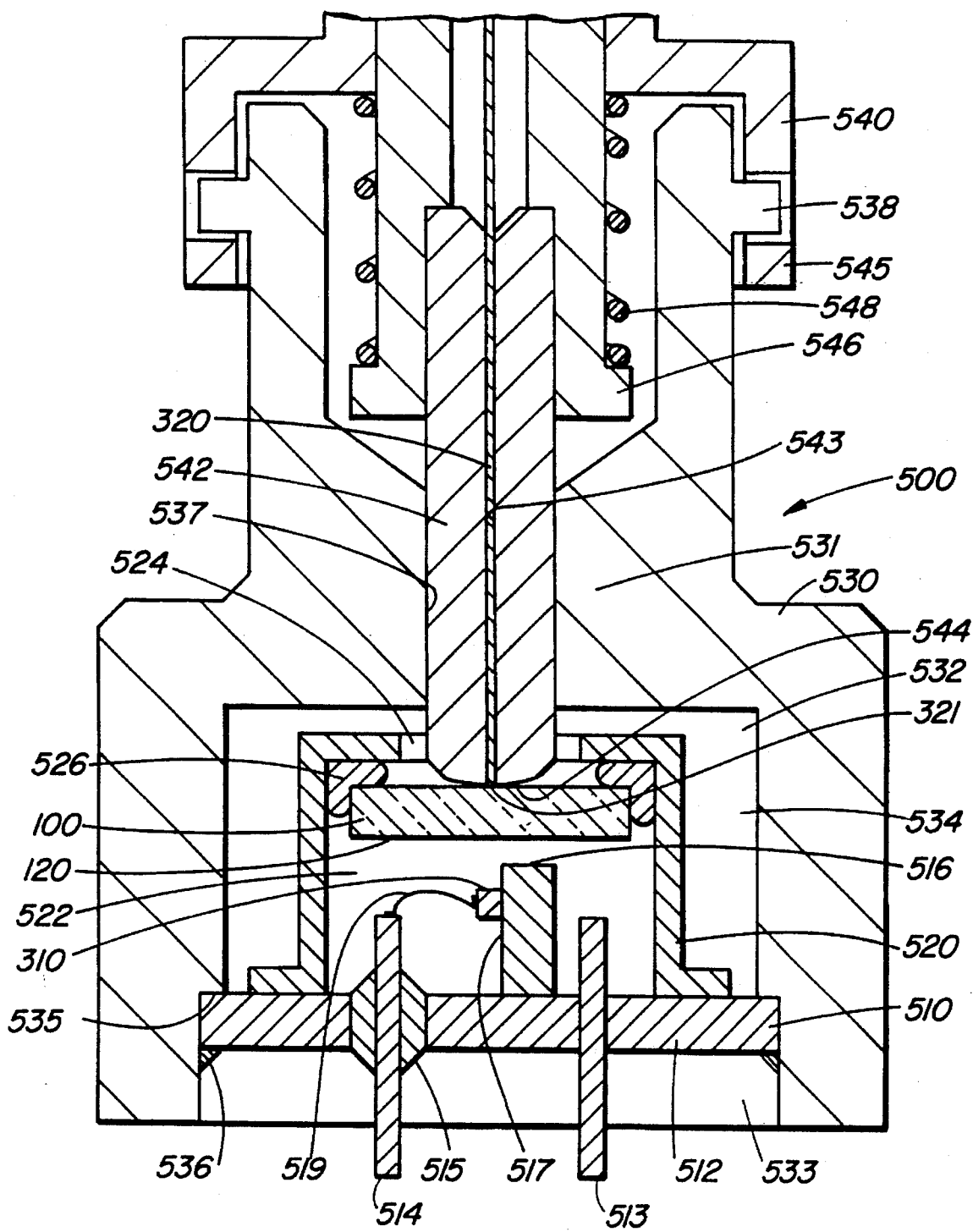
FIG. 5 is a cross-sectional view of a connectorized package for opto-electronic devices according to an embodiment of the invention.

FIG. 5 is a cross-sectional view of a connectorized package 500 according to a first embodiment of the invention. The package 500 comprises a housing in the form of a header 510 and a cap 520.

The header 510 comprises a circular base 512, a pair of terminal pins 513,514 extending through the base 512 and a pedestal 516 secured to the base 512. One terminal pin 513 and the pedestal 516 are electrically connected to the base 512. The other terminal pin 514 is electrically isolated from the base 512 by insulating material 515. The pedestal 516 is 2.425 mm±25 microns tall and is precisely positioned on the base 512 so that an edge emitting laser 310 mounted to a lateral device mounting surface 517 of the pedestal 516 is located on a central axis of the base 512. A wire bond 519 electrically connects a surface contact of the laser 310 to the terminal pin 514 which is electrically isolated from the base 512. A substrate contact of the laser 310 is electrically connected to the other terminal pin 513 via the pedestal 516 and the base 512.

The diameter of of the base 512 is tightly controlled to be 5.6 mm+0 microns−25 microns. Headers having such carefully controlled base dimensions are commonly used to package lasers for CD reading applications and are readily available.

The cap 520 is secured to the base 512 of the header 510 to define a cavity 522 within which the lasers 310 is contained. The cap 520 has a through aperture 524.which defines an opening into the cavity 522 over the laser 310. A fused fiber window 100 extends across the aperture 524 inside the cap 520 and is held in place by a sealant 526. The window 100 and sealant 526 seal the laser 310 in the cavity 522. An inside surface 120 of the window 100 is located approximately 50 to 200 microns from the laser 310.

The connectorized package 500 further comprises an alignment and retention arrangement in the form of a precision-molded plastic tube 530. The tube 530 has walls 531 which define a passage 532. The passage 532 has a relatively wide section 533 having an inner diameter of 5.613 mm±0.013 mm for receiving and precisely locating the header 510 laterally within the passage 532, and a narrower section 534 for receiving the cap 520. A transition 535 between the wide and narrower sections 533, 534 defines a shoulder which determines the axial position of the header 510 within the passage 532. The header 510 is secured against the shoulder by a suitable adhesive 536, such as epoxy. A central section 537 of the passage 532 has an inner diameter of 2,513 mm±0.013 mm, and is concentric with the section 533 which determines the lateral position of the header 510 within the passage 532. The tube 530 also has a latch formation in the form of a male bayonet fitting 538.

An optical fiber carrier in the form of a standard ST-type connector element 540 is shown received within the passage 532 and latched to the tube 530. The connector element 540 comprises a cylindrical ferrule 542 having a central passage 543 within which a multimode optical fiber 320 is received and retained. The connector element 540 further comprises a latch formation in the form of a female bayonet fitting 545, a ferrule holder 546, and a helical compression spring 548. The female bayonet fitting 545 cooperates with the male bayonet fitting 538 of the tube 530 to latch the ferrule 542 in the passage 532. The spring 548 acts between the female bayonet fitting 545 and the ferrule holder 546 to bias the ferrule 542 into the central section 537 of the passage 532 to precisely locate the ferrule 542 and its fiber 320 laterally within the passage 532 where it is laterally aligned with the laser 310 through the window 100. The spring 548 also biases a leading face 544 of the ferrule 542 against the window 100. The leading face 544 of the ferrule 542 is convex, and an end face 321 of the optical fiber 320 is flush with the leading face 544 of the ferrule 542, so that the end face 321 of the optical fiber 320 contacts the window 100.

In the assembled connectorized package 500, the lateral position of the header 510 is fixed in the wide passage section 533 of the precision molded tube 530 so that the laser 310, which is positioned on the central axis of the header 510, is located on the central axis of the passage 533. The lateral position of the ferrule 542 is fixed in the central passage section 537 of the tube 530 so that the fiber 320, which is positioned on the central axis of the ferrule, is located on the central axis of the passage 533. Consequently, the laser 310 and the fiber 320 are laterally aligned on the central axis of the passage 533. Moreover, the fiber 320 is biased axially against the window 100, and the laser 310 is approximately 50 microns to 200 microns from the inner face 120 of the window 100, so the coupling geometry is as illustrated in FIG. 4.

To fabricate the connectorized package 500, the laser 310 is mounted to the device mounting surface 517 of the pedestal 516 of the prefabricated header 510. Conventional precision chip mounting equipment should enable placement of the laser 310 on the pedestal 516 so that an upper end of the laser 310 is 2.375±25 microns above an upper surface of the base 512. The location of the pedestal 516 on the base 512 should be controllable to within 30 microns and the lateral positioning of the laser 310 on the pedestal should be controllable to within 25 microns so that the active region of the laser 310 is within approximately 40 microns of the central axis of the circular base 512. The wire bond 519 is then placed to electrically connect the laser 310 to the terminal pin 514 of the header 510.

Figure 6:
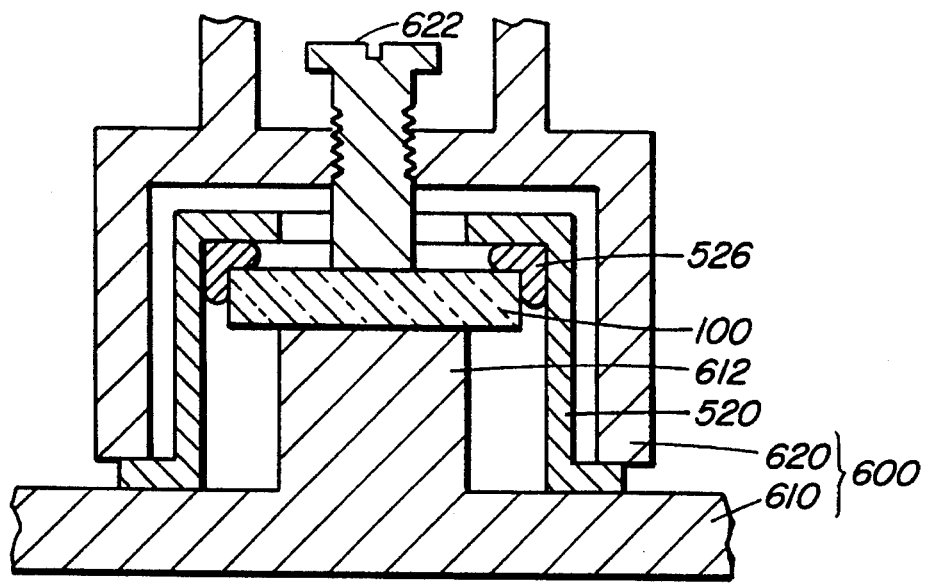
FIG. 6 is a cross-sectional view showing an operation for mounting a window of the package of FIG. 5 to a cap of the package of FIG. 5.

The window 100 is mounted inside the aperture 524 of the cap 520 so that the inner face 120 will be 2.500 mm±50 microns above the base 512 when the cap 520 is secured to the base 512. This is arranged by placing the cap 520 and window 100 in a suitable fixture 600 with the sealant 526 between the cap 520 and the window 100, as shown in FIG. 6. The fixture 600 comprises a base portion 610 having a 2.525 mm pedestal 612 and an upper portion 620 which is movable with respect to the base portion 610. With the upper portion 620 raised, the window 100 and cap 520 are placed over the pedestal 612. The fixture 600 is heated to soften the sealant 526, and the upper portion 620 is lowered onto the cap 520. The upper portion 620 of the fixture 600 urges the cap 520 into contact with the lower portion 610 of the fixture 600 to fix the positon of the cap 520. A precision adjustment screw 622 threaded through the upper portion 620 of the fixture 600 urges the window 100 into contact with the pedestal 612 to fix the position of the window 100 relative to the cap 520, compressing the sealant 526 as necessary. The fixture 600 is then cooled to harden the sealant 526 with the window 100 fixed 2.525 mm±25 microns above the bottom of the cap 520.

The material of the cap 520 and the sealant 526 are chosen so that the cap 520 and the window 100 have substantially the same coefficient of thermal expansion. For example, the cap 520 may be made of Alloy 52, and the sealant may be glass frit #7575 available from Corning Glass Works, Corning, N.Y. This minimizes the risk of seal or window failure due to temperature changes during the window-mounting operation. The position of the screw 622 is set and the pedestal 612 and the screw 622 are coated with suitable materials to ensure that compression between the pedestal 612 and screw 622 does not damage the window 100.

The cap 520 is then forced down onto the header 510 to bond the cap 520 to the header 510. The cap 520 may be compressed by 25 microns±25 microns during this operation, so that the resulting spacing between the laser 310 and the inner face 120 of the window 100 can be controlled to be between 50 and 200 microns. The laser 310 is now hermetically sealed in the cavity 522 and is therefore protected during further fabrication operations.

The hermetically sealed device is then inserted into the relatively wide passage section 533 of the precision molded tube 530 as shown in FIG. 5, until the header 510 engages the shoulder 535. A bead of adhesive 536 is run around the periphery of the header 510 to secure the sealed device in the tube 530. The packaged device is then ready for connection to a standard ST-type connector end as illustrated in FIG. 5.

A potential disadvantage of the connectorized package 500 is that the glass frit sealant 526 is under tension when the ferrule 542 is urged against the window 100 by the spring 548. The glass frit sealant 526 may have inadequate tensile strength to maintain a reliable seal for some applications.

Figure 7:
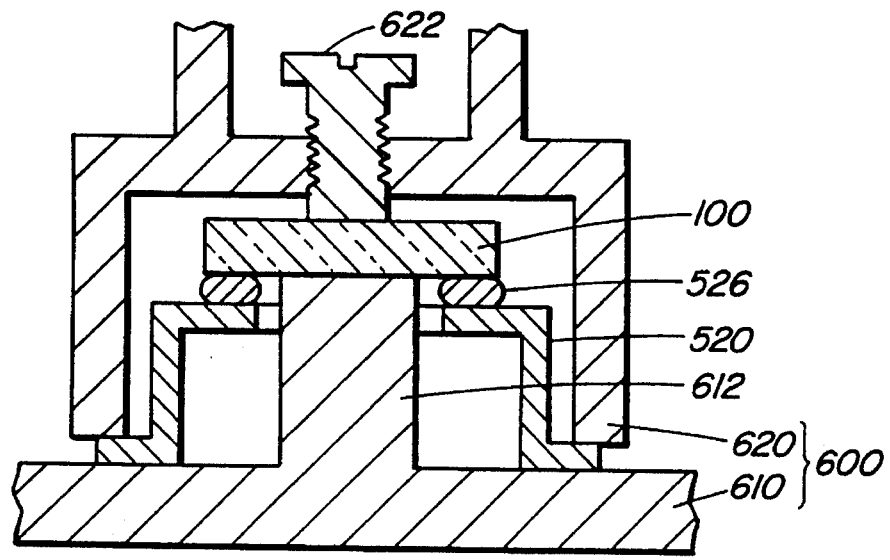
FIG. 7 is a cross-sectional view similar to FIG. 6 showing an alternative operation for mounting a window to a cap.

FIG. 7 illustrates an alternative operation for mounting the window 100 to the cap 520 so that the sealant 526 is in compression in the resulting connectorized package. In the alternative operation, a shorter cap 520 is placed over the pedestal 612 of the fixture 600 so that the pedestal 612 protrudes through the aperture 524. A thick layer of sealant 526 is applied to the cap 520 around the outside of the aperture 524 and the window 100 is placed onto the sealant 526. The fixture 600 is then heated and the upper portion 620 is lowered onto the window 100 to compress the sealant 526 until the window 100 contacts the pedestal 612 as shown in FIG. 7. The cap 520 is then compressed onto the header 510 to hermetically seal an opto-electronic device 310' in the cavity 522, providing the structure shown in FIG. 8. When this structure is mounted in the tube 530 and a standard ST-type connector element 540 is secured to the tube 530, the sealant 526 is under compression rather than tension.

In each of the connectorized packages described above, there is limited optical divergence within the window 100 and that divergence is independent of the window thickness. Consequently, the window 100 can be made thick enough to act as a stop for the leading end 544 of the optical fiber 320 and its surrounding ferrule 542. With limited optical divergence within the window 100, and substantially no optical divergence between the window 100 and the optical fiber 320, optical divergence between the opto-electronic device 310, 310' and the optical fiber 320 is substantially limited to the optical divergence which occurs between the opto-electronic device 310, 310' and the window 100. By keeping the distance between the opto-electronic device 310, 310' and the window 100 small (preferably less than 200 microns), the total optical divergence can be made small enough that no lens is required to provide adequate optical coupling for many applications. There is no need for very precise lateral positioning of the window 100 with respect to the opto-electronic device 310, 310' and the optical fiber 320 as would be required with lenses because the lateral positioning of the window 100 has little impact on coupling efficiency. Moreover, because no lens is required and alignment of the optical fiber 320 to the opto-electronic device 310, 310' can be achieved relatively simply after the opto-electronic device 310, 310' has been sealed in the housing, the packages and their methods of fabrication are relatively inexpensive.

The embodiments described above may be modified without departing from the principles of the invention.

Figure 8:
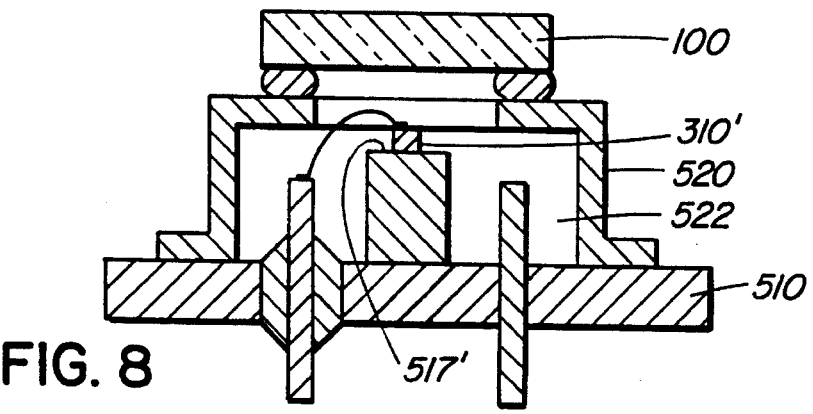
FIG. 8 is a cross-sectional view of a packaged opto-electronic device with a window mounted to a cap as illustrated in FIG. 7.

For example, other opto-electronic devices 310' such as surface-emitting lasers, LEDs and detectors can be used in place of an edge-emitting laser. Surface-emitting and surface-receiving devices 310' should be mounted to a device mounting surface 517' on the end of the pedestal 516 as illustrated in FIG. 8, and the pedestal 516 should be centered on the base 512 for such devices.

Sealants other than glass frit and solder may be useful for some applications.

The ferrules of some popular connectors do not have a convex leading face. If the leading face 544 of the ferrule 542 is flat and only nominally perpendicular to the ferrule axis, the end face 321 of the optical fiber 320 may not contact the window 100 when the ferrule 542 is urged against the window 100. Indeed, the end face 321 of the optical fiber 320 may fail to contact the window 100 even if the leading face 544 is convex if the window 100 is not exactly perpendicular to the ferrule axis. However, even under these conditions, it is expected that the spacing between the window 100 and the end face 321 of the optical fiber 320 will be small, and the waveguiding properties of the window 100 should provide for better optical coupling than can be provided by the non-waveguiding windows conventionally used in packages for opto-electronic devices.

These and other modifications of the embodiments described above are within the scope of the invention as defined by the claims which follow.

I claim:

1. An opto-electronic device assembly, comprising:

a housing having a cavity and an opening into the cavity;

an opto-electronic device mounted to the housing in the cavity and aligned with the opening;

a window extending across the opening to seal the opto-electronic device in the cavity, the window comprising a plurality of substantially parallel optical fiber sections joined side-by-side;

an optical fiber carrier;

an optical fiber carried by the optical fiber carrier; and an alignment and retention arrangement cooperable with the optical fiber carrier to align the optical fiber to the opto-electronic device through the window and to retain the optical fiber in that alignment with an end face of the optical fiber contacting the window.

2. An assembly as defined in claim 1, wherein:

each optical fiber section of the window comprises a cylindrical core having a diameter less than 10 microns surrounded by a substantially non-absorbing cladding, each optical fiber section having a numerical aperture greater than 0.3; and the optical fiber sections are secured in an arrangement having a packing fraction greater than 70%.

3. An assembly as defined in claim 1, wherein the housing comprises:

a header having a device mounting surface for carrying the opto-electronic device; and a cap secured to the header over the device mounting surface to define the cavity, the cap having an aperture therethrough defining the opening.

4. An assembly as defined in claim 3, wherein the cap and window have substantially the same coefficient of thermal expansion.

5. An assembly as defined in claim 3, wherein the window extends across the aperture inside the cap.

6. An assembly as defined in claim 3, wherein the window extends across the aperture outside the cap.

7. An assembly as defined in claim 3, wherein the header comprises a pedestal extending toward the cap, the opto-electronic device being mounted to the pedestal.

8. An assembly as defined in claim 1, wherein the window is separated from the opto-electronic device by a gap which is between 50 microns and 200 microns.

9. An opto-electronic device assembly comprising:

a housing having a cavity and an opening into the cavity;

an opto-electronic device mounted to the housing in the cavity and aligned with the opening;

a window extending across the opening to seal the opto-electronic device in the cavity, the window comprising a plurality of substantially parallel optical fiber sections joined side-by-side;

an optical fiber carrier;

an optical fiber carried by the optical fiber carrier; and an alignment and retention arrangement cooperable with the optical fiber carrier to align the optical fiber to the opto-electronic device through the window and to retain the optical fiber in that alignment with an end face of the optical fiber contacting the window, the alignment and retention arrangement comprising:

walls defining a passage for receiving the optical fiber carrier, the walls being mechanically coupled to the housing and the passage being axially aligned with the opening of the housing; and a latch formation for cooperation with a complementary latch formation which is mechanically coupled to the optical fiber carrier to secure the optical fiber carrier in the passage.

10. An assembly as defined in claim 9, wherein:

a leading face of the fiber carrier contacts the window when the optical fiber carrier is received and latched within the passage; and the optical fiber has an end face which is flush with the leading face of the fiber carrier.

11. An opto-electronic device assembly as defined in claim 10, wherein the optical fiber carrier comprises:

a ferrule having a central passage for receiving the optical fiber;

a latch formation for cooperation with the latch formation of the alignment and retention arrangement to latch the ferrule in the passage of alignment and retention arrangement; and a biasing arrangement mechanically coupling the ferrule to the latch formation, the biasing arrangement urging the leading face of the ferrule against the window when the ferrule is latched in the passage.

12. An opto-electronic device assembly as defined in claim 11, wherein the ferrule has a convex leading face.

13. An opto-electronic device assembly as defined in claim 10, wherein the end face of the optical fiber contacts the window.

14. An assembly as defined in claim 10, wherein:

the passage of the alignment and, retention arrangement receives the housing to laterally locate the opto-electronic device in the passage; and the walls defining the passage define a shoulder for engaging the housing to axially locate the opto-electronic device in the passage.

* * * * *